UNITED STATES PATENT OFFICE.

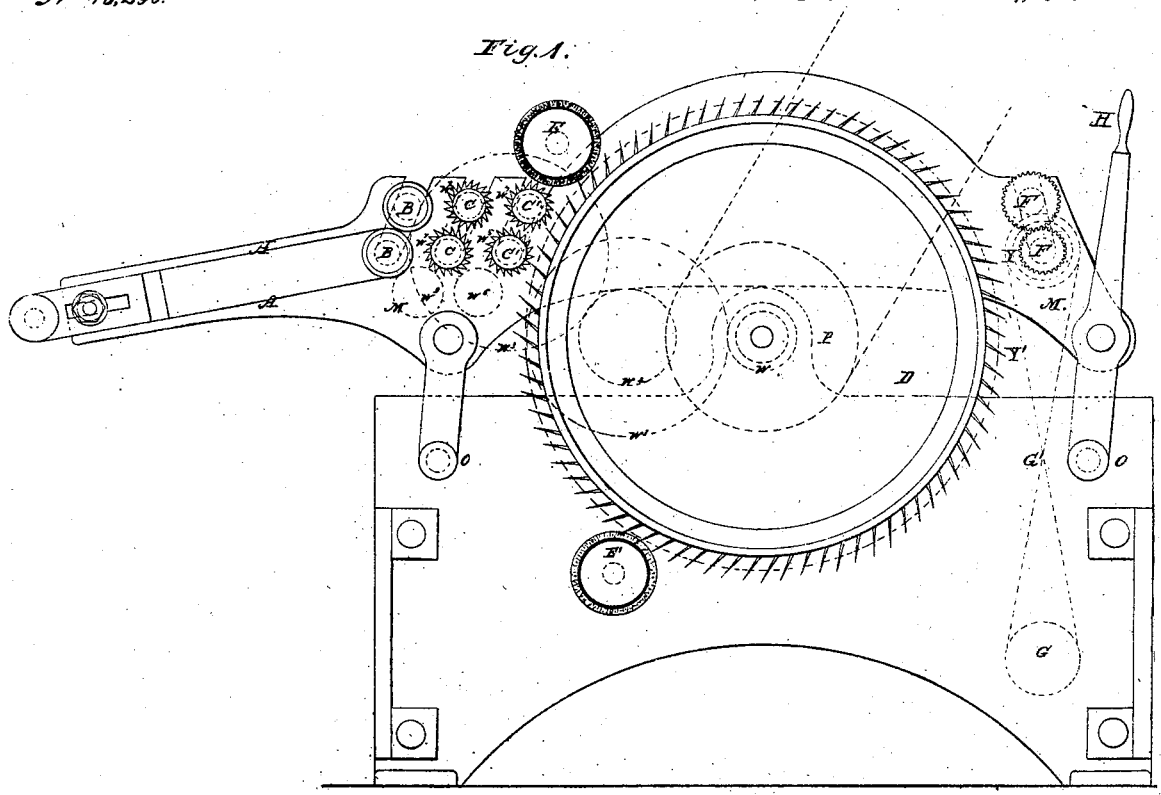
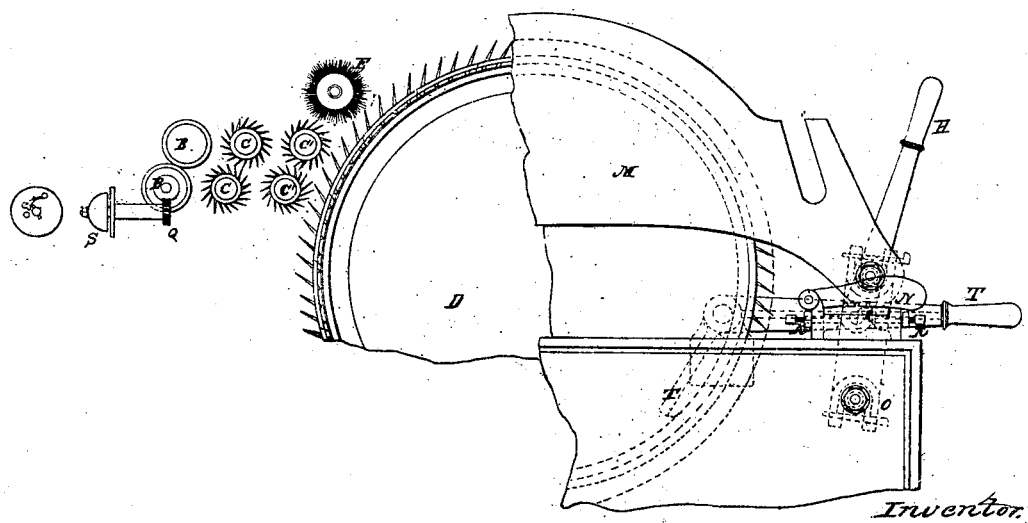

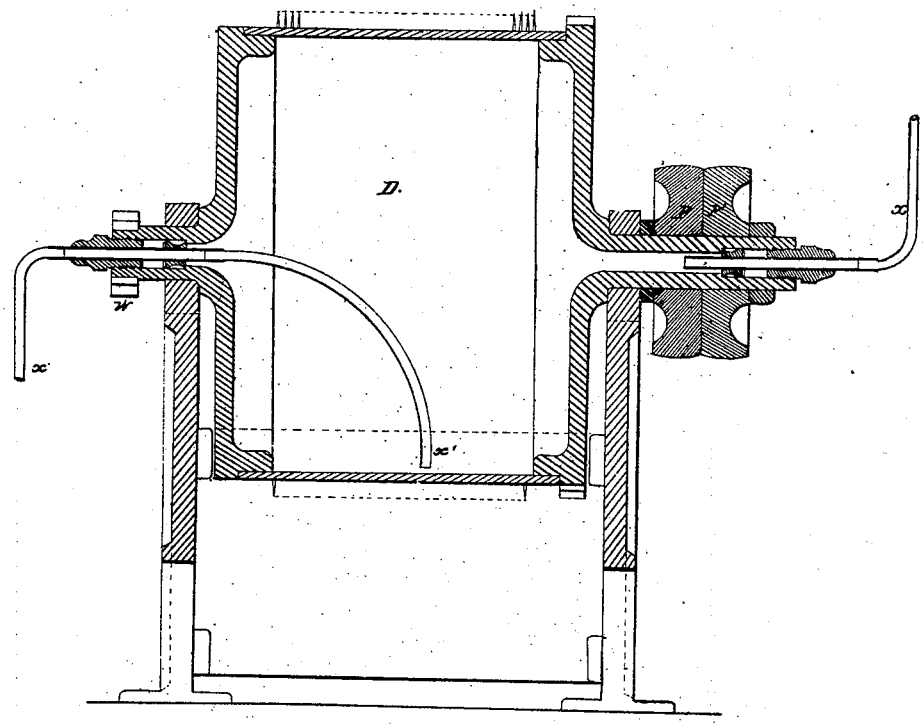
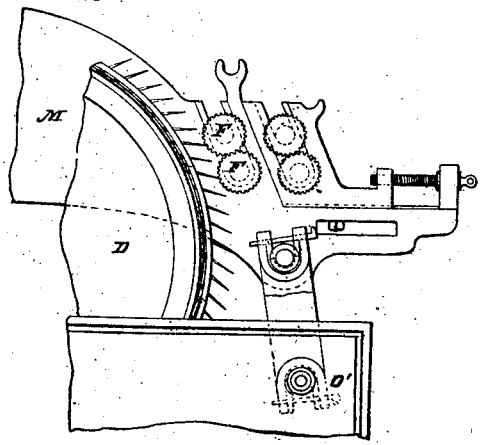

A. REINHARDT, OF NEW YORK, N. Y., ASSIGNOR TO NAS. SCHLUMBERGER & CO.

MACHINERY FOR PREPARING WOOL FOR COMBING.

Specification of Letters Patent No. 13,290, dated July 17, 1855.

*To all whom it may concern:*

Be it known that I, ALBERT REINHARDT, of the city, county, and State of New York, have invented certain new and useful Improvements in Machinery for Preparing Wool and other Fibers for Combing, &c.; and I do hereby declare the following to be a full, clear, and exact description and drawing thereof, in which—

Figure 1, is a vertical longitudinal section. Fig. 2, is a side view showing a sectional portion of the case. Fig. 3, is a vertical cross section of the machine at the axis of the main cylinder. Fig. 4, is a section showing the take off rollers.

The new machine is a combination of a feeding, a working and a drawing off apparatus, the description of which several parts is as follows: The feeding apparatus consists of an endless apron A receiving a continuous revolving motion from the driving power and on this the fibrous material is spread either by hand or in the form of a fleece or sheet. A pair of brass or iron rollers B having nearly the same surface speed as the apron receives the fleece or sheet from it; their purpose is to prevent any improper substance that may chance to fall upon the apron which would injure or damage the valuable set of teeth upon the working apparatus from passing into the machine. Beyond the guard rollers B through which the fleece passes are two pairs of feed rollers c c′ having a continuous revolving motion at the same speed as the rollers B or nearly so. These rollers may be fluted or porcupine rollers or of other suitable surface. Their object is to take hold of the fleece delivered by the rollers B and properly present it to the working drum to be operated upon. Just above the rollers C′ and a little in advance of them a brush E is located so regulated as just to enter a little way between the teeth of the working drum; it receives its motion from the drum and runs at the same surface speed, it is employed to force the fibers detached from the feed rollers by the teeth of the drum into said teeth. The different parts of the feeding apparatus just described receive their proper motions from the drum shaft by means of a series of gear wheels.

The whole feeding apparatus is placed or fixed on a carriage or movable frame M which oscillates on an axis o at one end and another o′ at the opposite end of said carriage. The feed carriage receives a motion forward and back toward and from the working drum by means of the lever H the object of the motion being to throw the gear wheel w′ out of gear from the pinion w so as to stop the feeding when the drum is filled with fibers, which require to be taken off with the drawing off apparatus.

It is very important that the feeding rollers be properly adjusted toward the working drum D. The apparatus employed to effect this adjustment is shown in Fig. II. K K′ are two set screws affixed to projections on the frame of the machine; on the lever H there is a projection R which oscillates between said set screws, and the extreme positions of the carriage are regulated by the screws and held in place by the weight N in which is three notches which catch on a small projection on the part R. Two of these notches are for the extreme positions of the carriage the third or center one is for the middle position.

It is a matter of great importance to have the same amount of fleece upon the drum preparatory to each removal. In Fig. 2, a small bell is shown at s which is made to ring at a given number of revolutions of the drum. If however a given amount of fleece only is spread upon the feeding apron each time, the bell is rendered unnecessary. When the proper quantity of fleece is accumulated upon the drum the feeding is stopped and the fleece drawn off by the apparatus about to be described.

The working apparatus consists of a cast iron drum D covered with teeth turning at about 100 to 150 revolutions on its own axis and receiving its motion from the driving pulley P. The toothed surface of the drum D in passing before the feeding rollers c′ straightens and opens the ends of the fleece presented for this action and gradually detaches the fibers as they are released from the feed rollers and accumulates them around the circumference of the drum in the form of a fleece or sheet.

The drum may be heated by steam so as to dry the fibers or prevent their being injured if the character of the fibers require to be heated in working. To effect this the steam is delivered into the drum from a steam pipe x shown in Fig. 3, entering at the hollow axis and the condensed water may be driven out through the siphon pipe x. Both pipes pass through the axis of the drum with stuffing boxes connecting them therewith.

E' is a brush working in the same manner and having the same object as the brush e. When the drum teeth are filled with a proper quantity of fiber the fleece thus formed must be drawn off for which purpose the drum is stopped at a given time which is effected by shipping the driving belt onto the loose pulley P' and applying the brake t which is pressed against the inner surface of the drum by means of the lever t' and the drum is at once stopped.

The drawing off apparatus consists of the following parts: a pair of drawing off rollers F, F', which rollers may receive at a given time a regular revolving motion from the pulley G and belt G'. The drawing off rollers are placed in the same carriage as the feeding apparatus but on the opposite side of the drum D and at a certain distance therefrom when at rest as shown in the drawings, at the moment the feeding is taking place. When the drum is filled and stopped as above described the carriage M is pushed forward toward the drum with the drawing off rollers which at the same time stops the feeding rollers. The fleece or sheet is then broken asunder and one end caught between the drawing off rollers which at that time are put into revolution and thus draw the fleece of fibers from the drum and deliver it in a sheet or fleece ready to be acted upon by other machines. We have found it to be well to have the drum D driven by gearing at the time the fleece is drawn off by the rollers F, F. For that purpose a pinion Y is fixed on the axis of roller F, and around the circumference of the drum there is a toothed wheel V' corresponding therewith. The pinion when moved forward by the carriage gears into the toothed wheel and the motion of the roller is thus communicated to the drum. Instead of one pair of rollers two may be used as shown in Fig. 4 and the second pair may turn at the same, or a greater speed than the first drawing off rollers. They are fixed in the carriage at a distance from rollers F F' regulated according to the length of the fibers to be operated upon.

Having thus fully described the apparatus what I claim therein as new and desire to secure by Letters Patent is—

The combination of the feeding, working and drawing-off apparatus constructed and arranged in the manner set forth the feeding and drawing off apparatus being so combined as to be alternately brought into action with the working drum and brought to a state of rest when not in working contact with the drum all as above specified.

ALB. REINHARDT.

Witnesses:
J. J. GREENOUGH,
HEYWOOD M. SUMNER.